United States Patent
Neuman et al.

(10) Patent No.: US 7,274,403 B2
(45) Date of Patent: Sep. 25, 2007

(54) MOTION ADAPTIVE DEINTERLACER WITH INTEGRATED DYNAMIC FORMAT CHANGE FILTER

(75) Inventors: Darren Neuman, Palo Alto, CA (US); Richard H. Wyman, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 440 days.

(21) Appl. No.: 10/875,422

(22) Filed: Jun. 24, 2004

(65) Prior Publication Data

US 2005/0168632 A1    Aug. 4, 2005

Related U.S. Application Data

(60) Provisional application No. 60/540,736, filed on Jan. 30, 2004.

(51) Int. Cl.
*H04N 7/01* (2006.01)
*H04N 9/74* (2006.01)

(52) U.S. Cl. .................. 348/448; 348/452; 348/581

(58) Field of Classification Search ............ 348/448, 348/452, 581; 382/298–300; 345/660, 665, 345/667
See application file for complete search history.

(56) References Cited

U.S. PATENT DOCUMENTS

| | | | |
|---|---|---|---|
| 4,400,719 A | | 8/1983 | Powers |
| 6,002,446 A | * | 12/1999 | Eglit .......................... 348/581 |
| 6,313,773 B1 | * | 11/2001 | Wilson et al. .............. 341/143 |
| 6,359,654 B1 | * | 3/2002 | Glennon et al. ............ 348/448 |
| 6,681,059 B1 | * | 1/2004 | Thompson ................... 382/298 |
| 6,757,022 B2 | * | 6/2004 | Wredenhagen et al. ..... 348/452 |
| 2002/0184275 A1 | * | 12/2002 | Dutta et al. ................. 708/300 |
| 2003/0076899 A1 | * | 4/2003 | Kumar et al. ............... 375/316 |

* cited by examiner

*Primary Examiner*—Victor R. Kostak
(74) *Attorney, Agent, or Firm*—McAndrews Held & Malloy Ltd.

(57) ABSTRACT

A system and method that scales interlaced video fields with different sizes in a deinterlacer. The deinterlacer may expect video fields of a certain size. The input to the system may be a video stream of interlaced content, with fields having different sizes depending on the video content. The method scales the input video fields to the appropriate size expected by the deinterlacer. The expected size of the fields may be programmable. The method may provide an output with the expected size of black pixels in the absence of an input to the system.

5 Claims, 4 Drawing Sheets

MOTION ADAPTIVE DEINTERLACER WITH INTEGRATED DYNAMIC FORMAT CHANGE FILTER

RELATED APPLICATIONS

This patent application makes reference to, claims priority to and claims benefit from U.S. Provisional Patent Application Ser. No. 60/540,736, entitled "Motion Adaptive Deinterlacer with Integrated Dynamic Format Change Filter," filed on Jan. 30, 2004, the complete subject matter of which is hereby incorporated herein by reference, in its entirety.

This application makes reference to U.S. patent application Ser. No. 10/314,525 filed Dec. 9, 2002, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In the field of video compression, communication, decompression, and display, there has been for many years problems associated with supporting both interlaced content and interlaced displays along with progressive content and progressive displays. Many advanced video systems support either one or the other format. As a result such devices as deinterlacers became an important component in many video systems. Deinterlacers convert interlaced video content into progressive video format.

Deinterlacing takes interlaced video fields and coverts them into progressive frames, at double the display rate. Certain problems may arise concerning the motion of objects from image to image. Objects that are in motion are encoded differently in interlaced fields from progressive frames. Video images, encoded in deinterlaced format, containing little motion from one image to another may be deinterlaced into progressive format with virtually no problems or visual artifacts. However, problems arise with video images containing a lot of motion and change from one image to another, when converted from interlaced to progressive format. As a result, some video systems were designed with motion adaptive deinterlacers.

Today, motion adaptive deinterlace video systems rely on multiple fields of data to extract the highest picture quality from a video signal. Combining multiple fields of data for deinterlacing can only be done when all the fields are the same size image. Hence, the system expects the input image to be a certain size, and all the processing that the system carries is designed to accommodate the specific expected image size.

Typically, broadcasted analog standard definition (SD) images are sampled at 720×480 frames in progressive systems or 720×240 fields in interlaced systems. Hence, analog signals coming in are always 720 wide. When the channel is changed from one SD channel to another SD channel, the broadcast still has the same format, with a width of 720 pixels per line.

However, in many video systems such as, for example, broadcast MPEG systems, sending images with width less than 720 pixels provides savings in the satellite and in the cable system. A certain channel may get broadcasted at 352×480 format and another channel may get broadcasted at 720×480 format. A viewer does not notice the change when watching it, since as the channels change, the digital receiver takes the channel inputs and scales them to a fixed size that fits the viewer's screen.

The change in the field size creates a problem, which is that existing deinterlacer circuits fail at the boundaries between video frames with different sizes. During a deinterlacing process, in order to compare one line in a field to the same line in a field two fields ago, the two fields have to have the same width. If, during the middle of a transmission, the horizontal size of a field changed on the fly, in the case of 352×480 and 720×480 formats, the deinterlacer is suddenly trying to compare 352 samples to 720, which will not work.

Existing systems either, ignore this problem and incorrectly deinterlace objects of different sizes, or the deinterlacer is turned off during a dynamic format change. A common approach to this problem is when there is a change in the input image size, the deinterlacer is disabled and the video is passed through the system, until the system is flushed and the new data and the new width are recovered. Hence, when the resolution at the broadcaster end is changed, the viewer is looking at a screen and all of a sudden the screen gets fuzzy, then a half second later the screen gets sharp again, which may be irritating to a viewer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that process interlaced video fields with different sizes in a deinterlacer. The method may comprise determining the size of an input field; determining the expected size of an output field; scaling the input field to the expected size; and outputting fields with the expected size. The method may further comprise outputting a black field of the expected size when no input field is received. The expected size of the outputted fields may be programmable in an embodiment of the present invention.

The system may comprise an integrated filter that scales the incoming fields to produce output fields continuously with the expected size. In an embodiment of the present invention, the filter may be a poly-phase scaler. The filter may be a finite impulse response filter, or an infinite impulse response filter. In an embodiment of the present invention, the system may output a field with start of a field signal; end of a field signal; start of a line signal; and end of a line signal.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
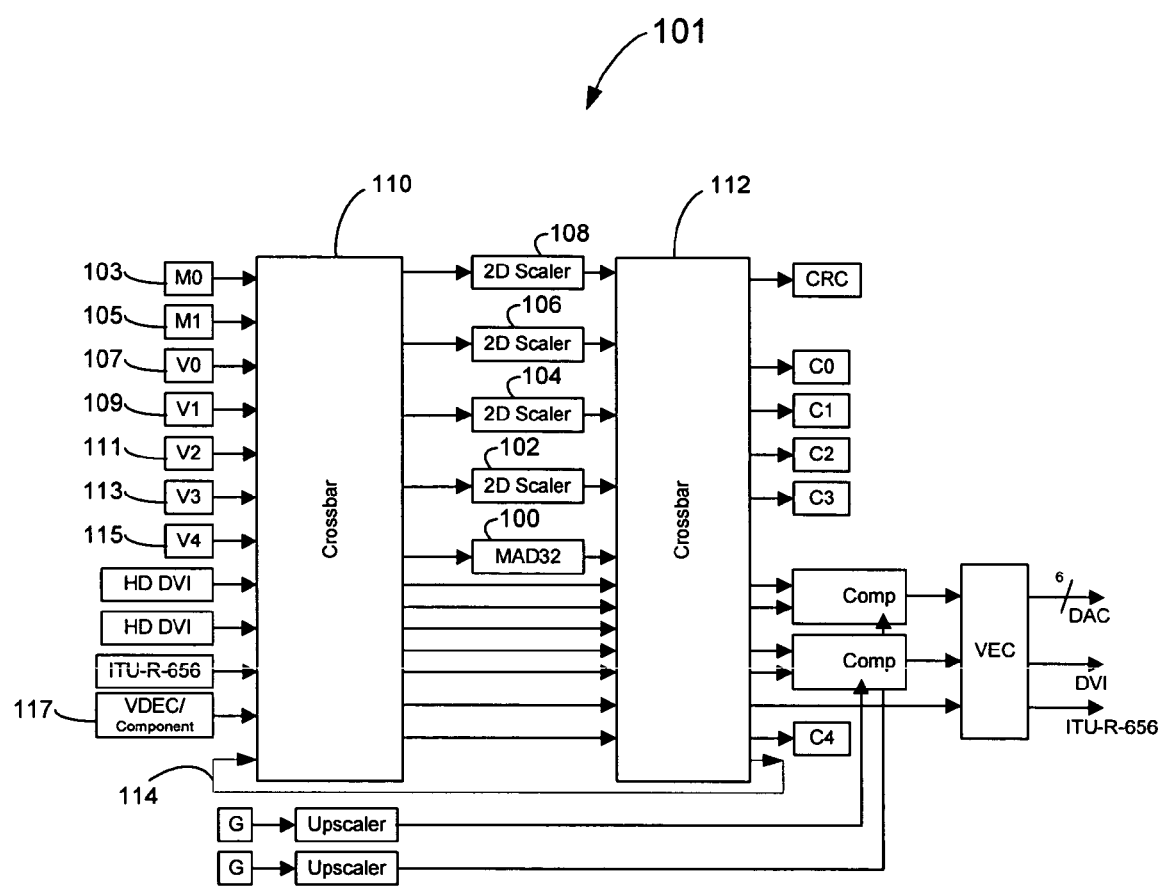
FIG. 1a illustrates a block diagram of an exemplary architecture for positioning of a MAD-3:2, in accordance with an embodiment of the invention.

Aspects of the present invention relate to processing video signals. More specifically, certain embodiments of the invention relate to a method and system that support a variety of video source sizes. Although the following discusses an embodiment of the invention with respect to video processing, it should be understood that the present invention may be modified for use in other systems. Additionally, while the following discusses aspects of the present invention with respect to horizontal scaling, it should be understood that the present invention may also be used for vertical scaling.

Certain aspects of the invention may comprise methods and systems for a motion adaptive deinterlacer (MAD) capable of reverse 3:2 pull-down and 3:2 pull-down with cadence detection, which may be referred to as MAD-3:2 or MAD32, that may be utilized in a video network (VN). The algorithms and architectures for the motion adaptive deinterlacer may be adapted to acquire interlaced video fields from one of a plurality of video sources in the video network and convert the acquired interlaced video fields into progressive frames, at double the display rate, in a visually pleasing manner.

The motion adaptive deinterlacer (MAD-3:2) may be adapted to accept interlaced video input from a video bus (VB) and output deinterlaced, progressive video to the video bus (BUS) utilized by the video network. The motion adaptive deinterlacer may accept, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field-by-field basis up to, for example, a width of 720. The motion adaptive algorithm utilized by the motion adaptive deinterlacer (MAD-3:2) may be adapted to smoothly blend various approximations for the missing pixels to prevent visible contours produced by changing decisions.

A plurality of fields of video may be utilized to determine motion. For example, in an embodiment of the invention, five fields of video may be utilized to determine motion. The motion adaptive deinterlacer (MAD) may produce stable non-jittery video with reduced risk of visual artifacts due to motion being misinterpreted while also providing improved still frame performance. The motion adaptive deinterlacer (MAD-3:2) may also provide additional fields per field type of quantized motion information, which may be selectable in order to reduce the risk of misinterpretation. For example, up to three (3) additional fields or more, per field type, of quantized low-cost motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided in order to reduce or eliminate jaggies in moving diagonal edges. The MAD-3:2 may provide reverse 3:2 pull-down for improved quality from film-based sources.

In accordance with another aspect of the invention, the algorithms and architectures for the motion adaptive deinterlacer (MAD) may also be adapted to provide bad-edit detection in order to ensure a visually pleasing transition to new cadence in situations where editing may have been carelessly performed. Furthermore, per-pixel correction may also be provided to improve the quality of subject matter containing both film and video at the same time. For example, per-pixel correction may be utilized for interlaced titles, which have been overlaid on film-based content. The motion adaptive deinterlacer (MAD-3:2) may also provide optional CPU control over, for example, 3:2 and/or 2:2 cadence detection and correction.

FIG. 1a is a block diagram of an exemplary architecture illustrating the positioning of a MAD-3:2 100, in accordance with an embodiment of the present invention. Referring to FIG. 1a, the MAD-3:2 100 along with a plurality of scalers (102, 104, 106, and 108), for example, may be positioned between a first crossbar 110 and a second crossbar 112. The first crossbar 110 may be referred to as an input crossbar and the second crossbar 112 may be referred to as an output crossbar.

The MAD-3:2 100 may comprise at least one video network input and at least one video network output and may be configured to maintain its own additional field stores. A feedback path may be provided from the output of the second crossbar 112 to the input of the first crossbar 110. This may allow any of the standard definition (SD) video sources such as the MPEG feeders 103 and 105, video feeders 107, 109, 111, 113 and 115, and/or VDEC 117, and so on, to function as an input to the MAD32 100 and/or one of the scalers 102, 104, 106, and 108. The VDEC 117 may be an analog video decoder that may process NTSC signals to separate color from luma. The MPEG feeders 103 and 105 may accept 4:2:0 and 4:2:2 video data and supply 4:2:2 video data. The video feeders 107, 109, 111, 113 and 115, may accept 4:2:2 video data and supply 4:2:2 video data. The output of the second crossbar 112 may be passed back to the first crossbar 110 via the feedback path 114.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

Figure 1B:
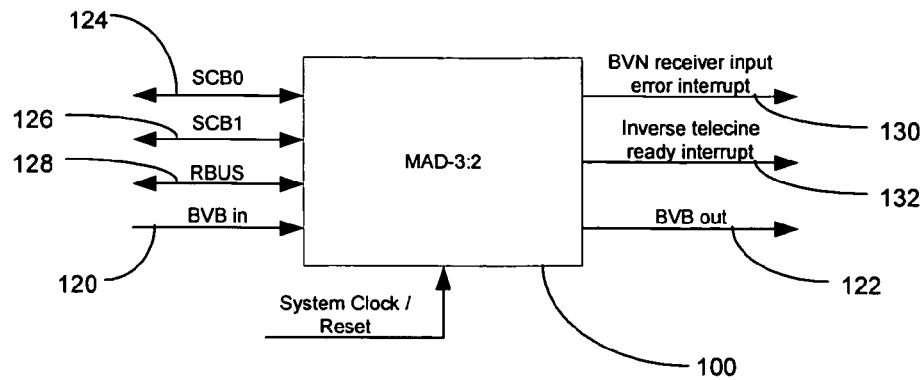
FIG. 1b illustrates a block diagram of exemplary interfaces for the MAD-3:2 shown in FIG. 1a, in accordance with an embodiment of the invention.

FIG. 1b is a block diagram illustrating exemplary interfaces for the MAD-3:2 100 shown in FIG. 1a, in accordance with an embodiment of the present invention. Referring to FIG. 1b, the MAD-3:2 100 may comprise a plurality of bus interfaces and may include the capability to generate one or more system CPU interrupts. The MAD-3:2 100 may run on, for example, a single system clock. However, the invention may not be so limited and more than one clock may be utilized. In one embodiment of the invention, the MAD-3:2 100 may include a video bus (VB) input 120, a video bus output 122, and, for example, two independent bidirectional read/write SCB client connections, SCB0 124 and SCB1 126. The SCB may be an internal bus utilized to access frames/fields stored in the memory. The video bus (VB) input 120 may be utilized for supplying fields to the MAD-3:2 100. The video bus output 122 may allow the deinterlaced output frames to be transferred throughout the video network and pass through a scaler before reaching a composite or capture block. An RBUS interface 128 may be utilized to configure the MAD-3:2 100 or to access its status via one or more interface signals and/or registers. The RBUS may be a general-purpose bus utilized for programming registers for control and configuration of the CPU. At least a portion of the interfaces of the MAD-3:2 100 may be synchronous to a clock input of the scaler. A video network receiver input error interrupt 130 may be generated on an input field size, which may differ from a programmed field size, which is expected. An inverse telecine ready interrupt 132 may be generated for every field, or at least some fields, at the point in time when the statistics gathered in the previous field are ready to be read by a CPU or other processor.

Figure 1C:
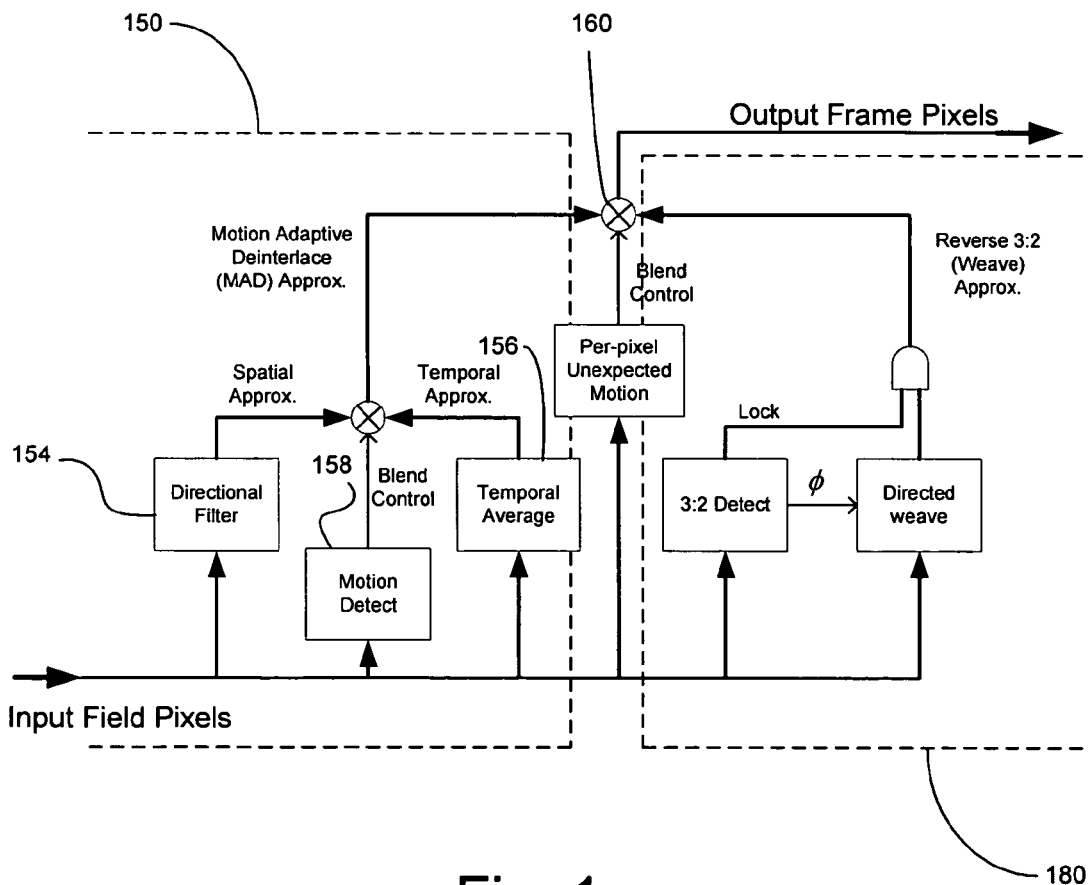
FIG. 1c illustrates a block diagram of an exemplary flow of the algorithm, which may be utilized by the MAD-3:2 of FIG. 1a and FIG. 1b, in accordance with an embodiment of the invention.

FIG. 1c is a block diagram illustrating an exemplary flow of the algorithm which may be utilized by the MAD-3:2 100 of FIG. 1a and FIG. 1b, in accordance with an embodiment of the present invention. Referring to FIG. 1c, there is shown a data flow corresponding to the algorithm utilized for deinterlacing the luma component of video. The algorithm may effectively be divided into two sub-blocks. For example, diagrammed on the left of FIG. 1c is the motion adaptive deinterlacer (MAD) method of deinterlacing 150 and on the right, there is shown the reverse 3:2 pulldown method 180. For every output pixel, motion adaptive deinterlacing 150, reverse 3:2 pulldown 180, or a blend 160 of motion adaptive deinterlacing and reverse 3:2 deinterlacing may be utilized to determine a motion-adapted value of the output pixel under consideration.

The motion adaptive deinterlacer (MAD) 150 may comprise a directional filter 154, a temporal average 156, and a blender 158. The MAD 150 may comprise suitable logic, code, and/or circuitry and may be adapted for performing the MAD method of deinterlacing. A processor may be adapted to perform the operation of the MAD 150. The MAD 150 may comprise local memory for storage of data and/or instructions. The directional filter 154 may comprise suitable logic, code, and/or circuitry and may be adapted for spatially approximating the value of the output pixel. The temporal average 156 may comprise suitable logic, code, and/or circuitry and may be adapted for temporal approximation of the value of the output pixel. The blender 158 may comprise suitable logic, code, and/or circuitry and may be adapted to combine the temporal and spatial approximations of the value of the output pixel.

In operation, the MAD 150 may receive input field pixels from an interlaced video field and convert them into output frame fields in a progressive frame, at double the display rate. The horizontal resolution of the input to the MAD 150 may change on a field-by-field basis. The MAD 150 may utilize a motion adaptive algorithm that may smoothly blend various approximations for the output pixels to prevent visible contours, which may be produced by changing decisions. In an embodiment of the present invention, it may be necessary to determine the amount of motion around each output pixel, to use an appropriate approximation for the output pixel. The MAD 150 may utilize the directional filter 154, the temporal average 156, and the blender 158 to obtain a motion-adapted value for the output pixel that is visually pleasing.

Figure 2:
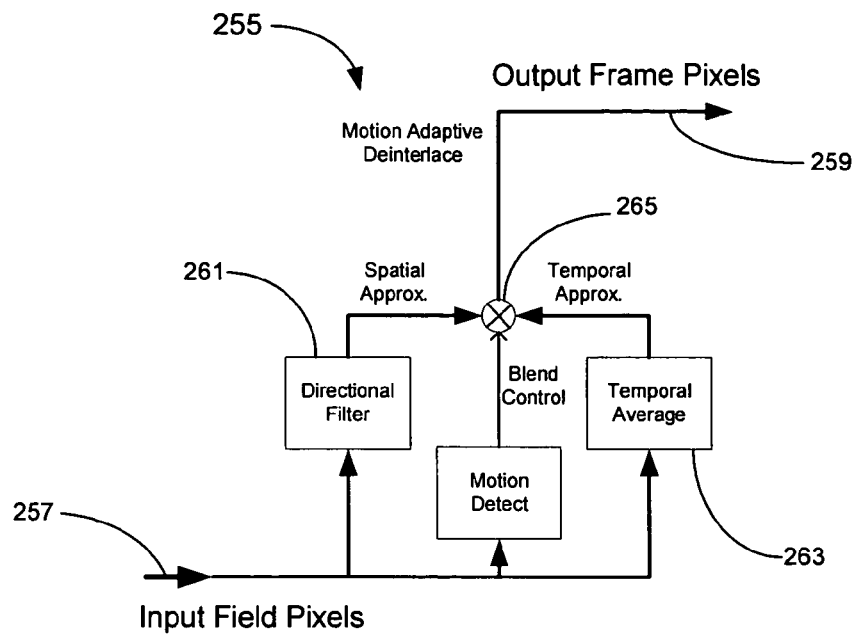
FIG. 2 illustrates a top-level diagram of an exemplary motion adaptive deinterlacer, in accordance with an embodiment of the present invention.

FIG. 2 illustrates a top-level diagram of an exemplary motion adaptive deinterlacer 255, in accordance with an embodiment of the present invention. The MAD 255 may be a component of a video network. In an embodiment of the present invention, a MAD 255 may take interlaced video fields from a video source and convert them into progressive frames, at double the display rate.

The MAD 255 may accept interlaced video input 257 from a video bus, and output deinterlaced, progressive video 259 to the video bus. The horizontal resolution of the input to the MAD 255 may change on a field-by-field basis. The MAD 255 may utilize a motion adaptive algorithm that may smoothly blend various approximations for the missing pixels to prevent visible contours, which may be produced by changing decisions. In an embodiment of the present invention, it may be necessary to determine the amount of motion around each output pixel, to use an appropriate approximation for the output pixel. The MAD 255 may utilize a directional filter 261 for the spatial approximation, a temporal average block 263 for the temporal approximation, and a blend control with a blender 265 to combine both approximations.

Figure 3:
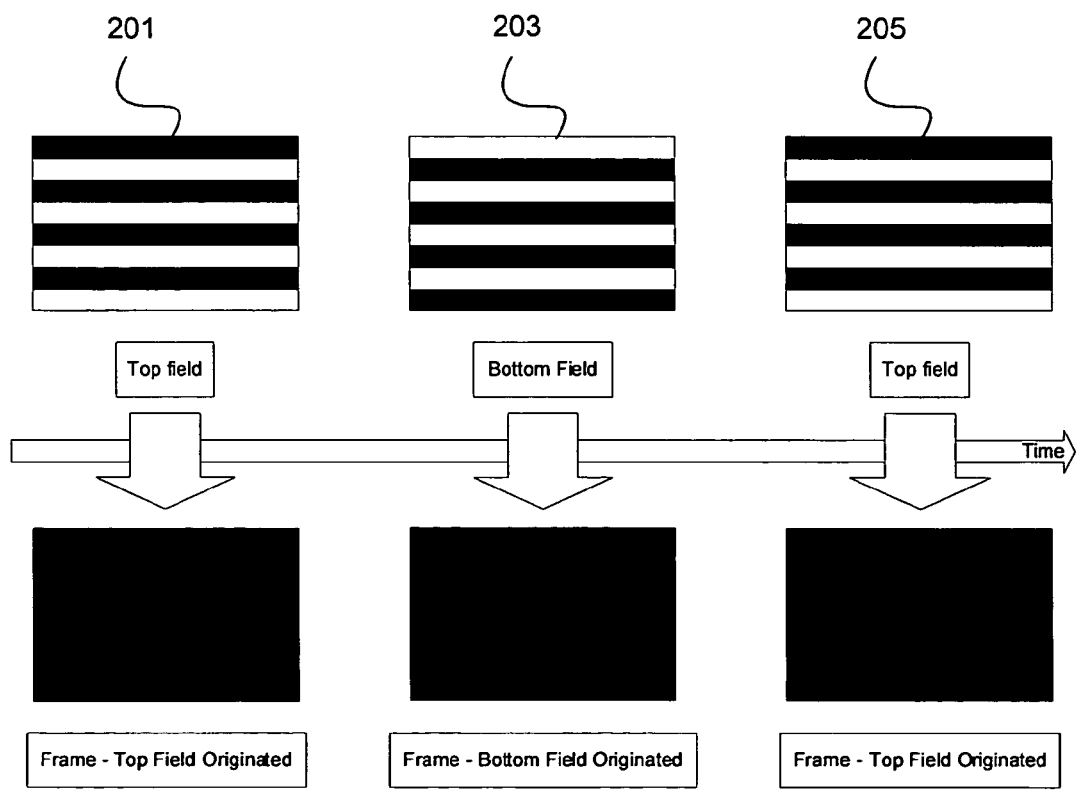
FIG. 3 illustrates an exemplary input and output of a deinterlacer, in accordance with an embodiment of the present invention.

FIG. 3 illustrates an exemplary input and output of a deinterlacer, in accordance with an embodiment of the present invention. Referring to FIG. 3, three fields are presented to the deinterlacer. The first field 201 is a top field, the second field 203 is a bottom field, and the third field 205 is a top field again. The first field 201 may be a bottom or top field, and the sequence of fields may alternate between top and bottom as appropriate depending on the first field 201. The deinterlacer may take the lines present in the field (black-colored lines in FIG. 3) and fill in the absent lines (clear lines in FIG. 3) to produce an output frame. The process of deinterlacing may be seen as taking in a line of pixels from the source field and producing two output lines of pixels. One line is the line that came from the source field and may be called the "present" line (black). The other line is the line that needs to be created and may be called the "absent" line (cross-hatched lines). This double output line pattern may then repeat to create the output frame. The pixels of the absent line may be computed using a deinterlacing procedure in accordance with an embodiment of the present invention. A line of present pixels may be output in parallel with a line of absent pixels. The two lines of output may make up the progressive frame lines.

Figure 4:
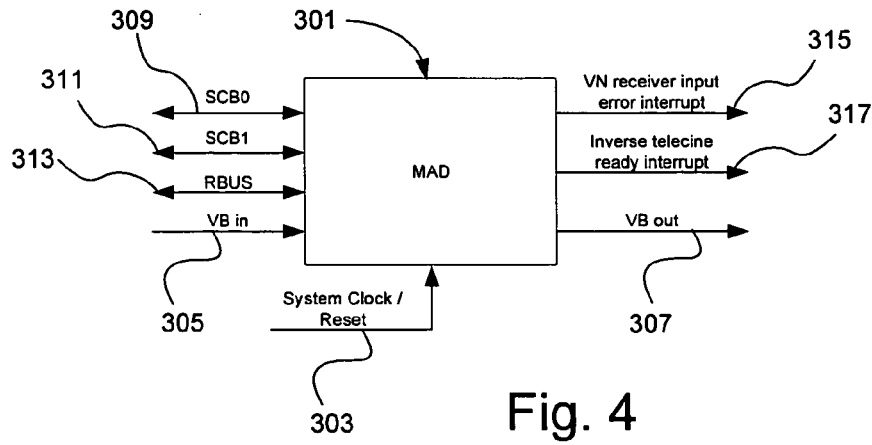
FIG. 4 illustrates a block diagram of an exemplary motion adaptive deinterlacer with interfaces, in accordance with an embodiment of the present invention.

FIG. 4 illustrates a block diagram of an exemplary motion adaptive deinterlacer 301 with interfaces, in accordance with an embodiment of the present invention. The MAD 301 may have five bus interfaces and may produce two system interrupts. The MAD 301 may run on a single system clock 303. The MAD 301 may have a video bus input 305, a video bus output 307, and two bidirectional (read/write) SCB client connections, SCB0 client 309 and SCB1 client 311. The video bus input 305 may be used for supplying fields to the MAD 301. The video bus output 307 may allow the deinterlaced output frames to continue in the video network. The register bus (RBUS) interface 313 may be used to configure the MAD 301 or to access its status. These five interfaces may be synchronous to the same clock. The video network receiver input error interrupt 315 may be generated when an input field size differs from an expected field size that was programmed. The inverse telecine ready interrupt 317 may be exerted every field at a point in time when the statistics gathered in the previous field are ready to be read by the CPU.

In an embodiment of the present invention, a picture may be sent to the MAD 301 one pixel at a time in raster order, through the video bus input 305. The MAD 301 may use the RBUS interface 313 to access internal registers. The MAD 301 may use the SCB0 client 309 to maintain a store of several previous interlaced fields. Depending on configuration controlled by CPU register programming, the SCB1 client 311 may or may not be active. When the SCB1 client 311 is active, it may maintain a store of two lots of three fields of quantized motion.

Figure 5:
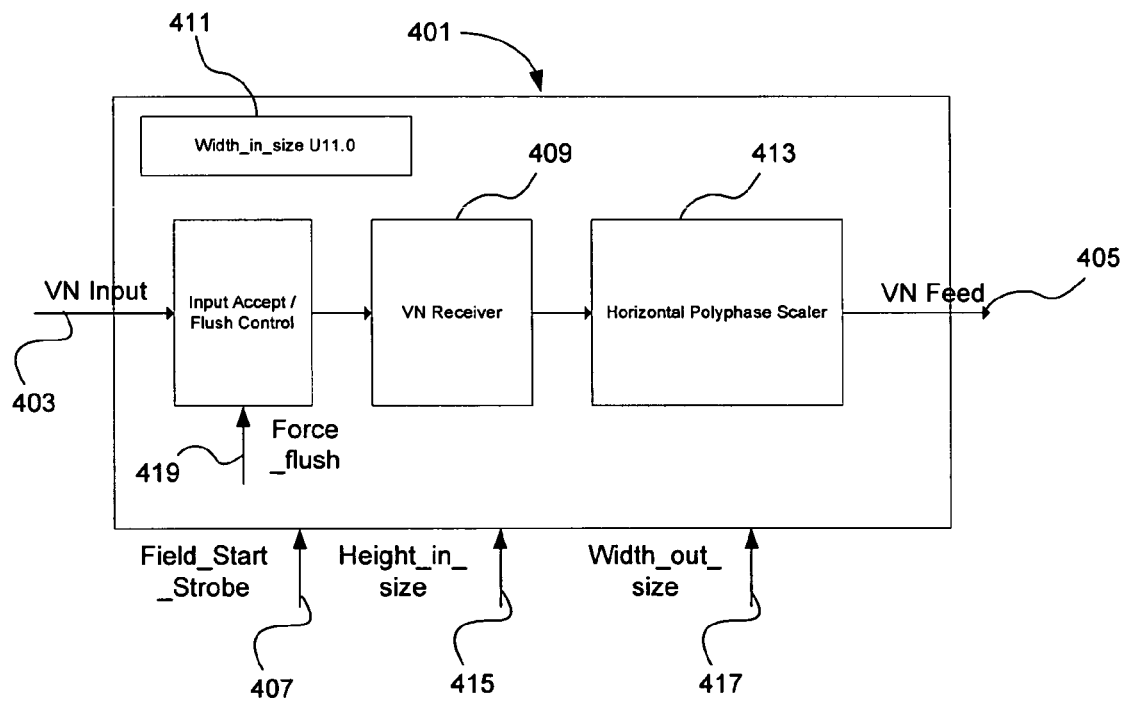
FIG. 5 illustrates a block diagram of an exemplary video network input control block, in accordance with an embodiment of the present invention.

FIG. 5 illustrates a block diagram of an exemplary video network input control block 401, in accordance with an embodiment of the present invention. In an embodiment of the present invention, the video network input control block 401 may be adapted to take the video network input 403 from the video bus and provide the video network feed 405 to other components of the system. The video network input control block 401 may horizontally scale the input video, depending on the horizontal size of the input video. The video network input control block 401 may also provide line alignment of pixels to the rest of the MAD system. The video network input control block 401 may halt at the end of a field and wait for a signal such as, for example, a new Field_Start_Strobe signal 407, which may indicate the start of a new field.

The video network receiver 409 may ensure that the height of the field received on the video network input 403 is equal to Height_in_size 415, which may be the number of vertical lines expected. The video network receiver 409 may have a locally programmed expected line width such as, for example, 720 pixels per line. At the end of a field the video network receiver 409 may stop accepting from the video network input 403. New input from the video network input 403 may be accepted after receiving the Field_Start_Strobe signal 407. The video network receiver 409 may discard any additional lines received beyond the Height_in_size 415. If too few lines are received, i.e., less than Height_in_size 415, additional lines may be inserted consisting of black pixels.

The horizontal poly-phase scaler 413 may be an 8-phase scaler with 8 taps per phase and may include phase interpolation to provide a total of 64 available phase positions. In an embodiment of the present invention, a parameter such as, for example, Width_in_size 411, which may be locally programmed, may indicate the expected number of pixels per line at the input of the horizontal poly-phase scaler 413. Additional pixels, over Width_in_size 411, may be discarded. Too few pixels, less than Width_in_size 411, may be made up to the required width by inserting black pixels. The horizontal poly-phase scaler 413 may pass frames at their current size or scale them up, hated on the size of the input frame and the expected frame size. The horizontal poly-phase scaler 413 may also scale frames down. The resolution of the incoming fields may change from one field to another, and such a change may be indicated to horizontal poly-phase scaler 413. The horizontal poly-phase scaler 413 may then scale the incoming lines from a field to ensure outputting fields with Width_out_size 417. For example, the Width_out_size 417 may be 720 pixels per line. If an incoming field has a width of 720 pixels, the horizontal poly-phase scaler 413 may horizontally scale the field by a factor of one. A next field may have a width of 360 pixels per line, and such information may be indicated to the horizontal poly-phase scaler 413, which may then horizontally scale the field by a factor of 2. The deinterlacing may not get interrupted, since transitions from one field size to another may be handled smoothly, and all fields may be scaled to the width expected by the system.

The video network feed 405 may include the line start, line end, field start, and field end signals. The Width_out_size 417 may indicate the expected number of pixels per line at the output of the horizontal poly-phase scaler 413. Additional pixels may be discarded. Too few pixels may be made up to the required width by inserting black pixels. If Force_flush 419 is set, nothing may be expected on the video network input 403. Following the Field_Start_Strobe 407, the entire field size of Height_in_size 415 by Width_out_size 417 of black pixels may be output as video network feed 405, including the line start, line end, field start, and field end signals.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for deinterlacing video fields, said system comprising:
   an input for receiving a first plurality of interlaced fields with at least two different sizes and a second plurality of interlaced fields with at least two different sizes; and
   a circuit for deinterlacing the first plurality of interlaced fields with the at least two different sizes, thereby resulting in progressive frames, wherein said progressive frames have a first size and deinterlacing the second plurality of interlaced fields with at least two different sizes, thereby resulting in other progressive frames having a second size.

2. The system of claim 1, wherein the circuit comprises a filter.

3. The system of claim 2, wherein the filter comprises a polyphase scaler.

4. The system of claim 1, wherein the plurality of sizes comprises a plurality of horizontal sizes.

5. The system of claim 1, wherein the plurality of sizes comprises a plurality of vertical sizes.

* * * * *